United States Patent [19]

Harand et al.

[11] 4,039,380
[45] Aug. 2, 1977

[54] NUCLEAR REACTOR PRESSURE VESSEL INSTALLATION

[75] Inventors: Elmar Harand, Hochstadt; Eberhard Michel, Nurnberg, both of Germany

[73] Assignee: Kraftwerk Union Aktiengesellschaft, Mulheim (Ruhr), Germany

[21] Appl. No.: 590,677

[22] Filed: June 26, 1975

[30] Foreign Application Priority Data

July 3, 1974 Germany .................... 2432011

[51] Int. Cl.² ................. G21C 13/04; G21C 9/00
[52] U.S. Cl. .................................. 176/87; 176/38
[58] Field of Search ............ 176/87, 38, 39; 52/401, 52/573; 248/DIG. 1, 20, 21, 204, 350, 352, 358 AA

[56] References Cited

U.S. PATENT DOCUMENTS

| 2,062,760 | 12/1936 | Overstrom | 248/358 AA |
|---|---|---|---|
| 2,572,919 | 10/1951 | French | 248/358 AA |
| 2,821,325 | 1/1958 | Chapellier | 176/87 |
| 3,129,836 | 4/1964 | Frevel | 176/87 |
| 3,295,808 | 1/1967 | Webb | 248/358 AA |
| 3,353,772 | 11/1967 | Fair | 248/358 AA |
| 3,601,343 | 8/1971 | Sivaslian | 248/204 |

FOREIGN PATENT DOCUMENTS

| 1,336,803 | 7/1962 | France | 176/87 |
|---|---|---|---|
| 2,066,553 | 6/1971 | France | 176/87 |
| 1,211,374 | 2/1966 | Germany | |
| 1,100,192 | 2/1961 | Germany | |
| 1,004,546 | 9/1965 | United Kingdom | 176/87 |
| 860,190 | 2/1961 | United Kingdom | |
| 852,840 | 11/1960 | United Kingdom | |
| 341,089 | 6/1972 | U.S.S.R. | 176/87 |

*Primary Examiner*—Samuel W. Engle
*Assistant Examiner*—Donald P. Walsh
*Attorney, Agent, or Firm*—Kenyon & Kenyon, Reilly, Carr & Chapin

[57] ABSTRACT

A nuclear reactor pressure vessel is vertically positioned in a concrete reactor pit. The vessel thermally expands and contracts axially and radially. To reduce the possibility of a wall rupture caused by the radial expansion, the top and bottom of the vessel are restrained from movement by the axial expansion, thus placing the vessel's wall under compressive stress in the axial direction. At the top this is done in any prior art manner. At the bottom, the restraint is provided by a series of vertical leaf springs circumferentially interspaced around the vessel's bottom, the lower ends of the springs being fixed to the vessel and the springs extending upwardly therefrom to upper support arrangements. Thus, the bottom of the vessel is suspended by the springs working in tension, while the radial expansion and contraction movements are accommodated by flexure of the springs.

8 Claims, 9 Drawing Figures

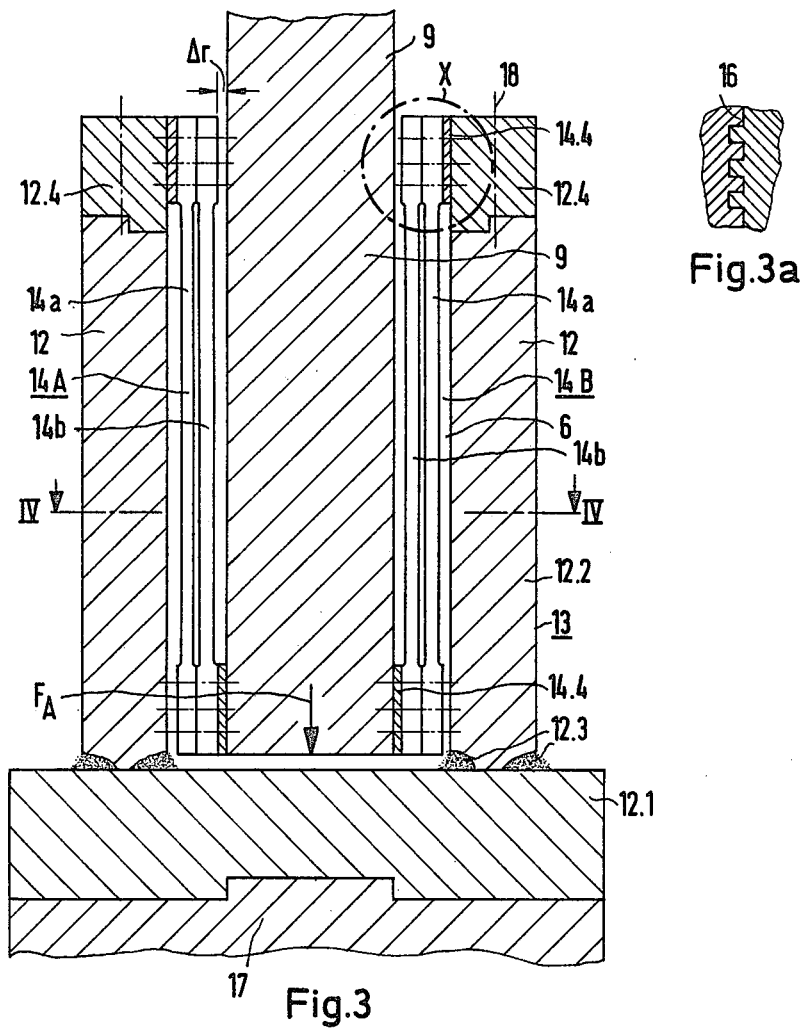

NUCLEAR REACTOR PRESSURE VESSEL INSTALLATION

BACKGROUND OF THE INVENTION

A nuclear reactor pressure vessel, as exemplified by a pressurized-water reactor, has a substantially cylindrical side wall closed by a bottom and a top which is normally a removable cover. The vessel is vertically positioned in a concrete reactor pit with the vessel's bottom supported directly or indirectly by the pit's bottom. The top of the vessel has struts, swinging hooks, etc., connecting it with the top rim of the concrete pit and designed to hold the vessel's top against upward movement when the vessel is thermally expanded axially. The design of the top holding means is such that when the vessel is thermally contracted, meaning it is cold, the top holding means are loose as required to permit removal of the vessel's cover, for example, the looseness disappearing as the vessel axially expands when the reactor is started up, so that at the vessel's operating temperature the vessel is rather highly stressed under compression in its axial direction, reducing the risk for a wall rupture due to the coincidental axial expansion involved. The dimensions of the pit are, of course, designed relative to the dimensions of the vessel to accommodate the vessel's expansion and contraction.

It follows, that when the vessel is at its operating temperature, it is highly stressed in its axial direction with its bottom exerting great force against the bottom of the pit. At the same time, the bottom of the vessel must be free to radially expand and contract.

In view of the above, various arrangements have been proposed for transmitting the stress from the bottom of the vessel to the bottom of the pit. These have contemplated the use of anti-friction bearing arrangements, horizontal sliding bearings, etc. They have all had undesirable features such as complicated design, large manufacturing and installation cost, and, possibly, unreliability under the severe surface conditions of heat and high stressing inherent to the conditions under which they must operate in the pit between the latter's bottom and the bottom of the axially stressed vessel during the operation of the reactor.

SUMMARY OF THE INVENTION

Briefly summarized, according to the present invention, the vessel's bottom holding means is formed by a plurality of leaf springs positioned vertically with their bottom ends fastened to the lower portion or bottom of the vessel and with their upper ends provided with support means, the vessel being suspended by the springs with the springs carrying the axial stress in tension. During radial expansion and contraction movement of the vessel's bottom, the springs are free to flex radially in the manner of cantilever springs.

The vertical leaf springs are distributed uniformly around the circumference of the vessel's bottom to provide for uniform stress distribution. Preferably the vessel's bottom is designed to provide for a circumferential skirt depending from and forming, in effect, a downward continuation of the side wall of the vessel, the bottom ends of the springs then being fastened to the bottom edge or rim of this skirt. With this arrangement, the leaf springs can be arranged in sets of inner and outer springs, respectively extending upwardly on the inner and outer sides of the skirt, a saddle or fork having arms extending upwardly on either side of the skirt serving to support the upper ends of the springs. The proportions of the parts are, of course, designed so that via the bottom edge of the skirt the vessel is supported by the springs in an upward direction with the springs and the vessel wall itself free to move radially while the bottom of the vessel within the boundary of the skirt is freely suspended.

In all cases, the springs may be of the multi-leaf type so they can safely carry the large tension stress to which they are subjected during the actual operations.

Furthermore, the leaf springs may be preloaded so that when the reactor vessel is cold and radially contracted, the leaf springs are strained inwardly, and when the vessel is radially expanded under its normal operation conditions, the springs are free from beam strain or are, in other words, in a relaxed condition free from elastic deflection other than, of course, the vertical axial tension which they carry as a reaction to the downward holding of the vertically expanded vessel, at the vessel's top.

BRIEF DESCRIPTION OF THE DRAWINGS

The accompanying drawings schematically illustrate the principles of the present invention, the various figures being as follows:

FIG. 3 is like FIG. 1 but shows a second example;

FIG. 3a in vertical section shows a detail taken from within the broken-line circle X in FIG. 3;

FIGS. 6a and 6b in vertical section show the second example with preloading arrangement so that the springs can be preloaded when the vessel is cold and unexpanded, while FIG. 6a shows the springs substantially unloaded by beam stress and as they operate for all practical purposes in simple tension during the reactor operation when the vessel is expanded radially.

DETAILED DESCRIPTION OF THE INVENTION

Figure 1:
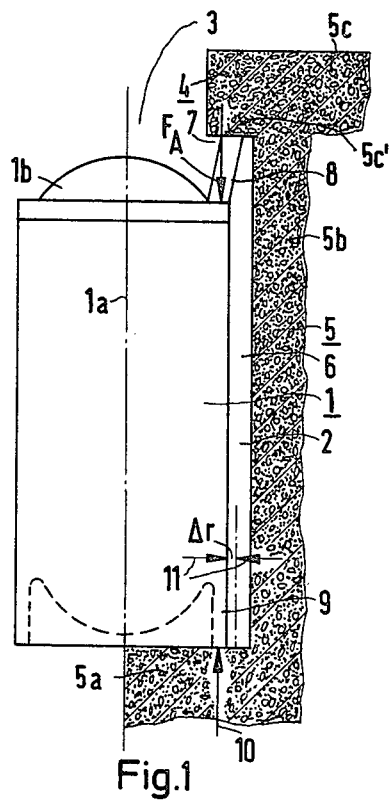
FIG. 1 shows the pressure vessel in elevation with half of the concrete forming the reactor pit, in vertical section, this view providing an example of the prior art construction.

FIG. 1 shows schematically how a reactor pressure vessel 1 of essentially cylindrical form is mounted in a reactor pit 2 with an upper opening 3. The rupture protection 4 for the reactor pressure vessel 1 is formed by a concrete hull 5 consisting of foundation or bottom parts 5a, side walls 5b and an upper collar area 5c. As usual, the concrete hull 5 is disposed essentially rotation-symmetrically about the reactor pressure vessel 1 or its axis 1a, and specifically, with a radial gap 6 between the respective cylinder surfaces, and with the axial gap 7 between the cover 1b of the reactor pressure vessel 1 and the collar area 5c. At 8 diagonal struts are indicated as means for bracing the vessel cover 1b against the shoulder 5c' of the collar area 5c, which means may alternately consist of pendulum supports, hydraulically adjustable hooks or the like. On its bottom side, the reactor pressure vessel 1 is provided with supporting parts 9, by means of which it rests on the foundation 5a. In the present case, the supporting parts 9 are designed in the form of an axially projecting support skirt. As indicated by the arrow 10, the foundation must absorb a reaction force equivalent to the axial load of the reactor pressure vessel 1, this axial load $F_A$ being composed of the weight of the vessel and the preloading force resulting from the cover bracing. The distance $\Delta r$, indicated not to scale by the arrows 11, represents the radial thermal expansion of the reactor pressure vessel 1 occurring in operation, relative to its cold state. In addition, the vessel 1 is subjected to an axial thermal expansion (not shown).

As explained below with reference to FIGS. 2 to 6b, the invention now makes possible a particularly favorable, heat-flexible mounting of the reactor pressure vessel 1 to holding parts 12 of a mounting pad 13 within a rupture protection device surrounding the pressure vessel 1 with a gap 6, 7, 7.1. To achieve this (see FIG. 2 in particular) the vessel 1 is mounted by means of bending or leaf springs 14, one end 14.1 of which is fastened to the holding parts 12 and the other end 14.2 to the supporting parts 9 of the vessel 1, hereinafter called support skirt, so that the bending springs 14 are stressed in tension by the axial load (arrow $F_A$) of the vessel 1, and in flexure by its radial thermal expansion $\Delta r$, (see the arrows 11).

The dash-dotted lines 15 indicate a serration arrangement 16, seen in detail in FIG. 3a in conjunction with FIG. 3, by means of which the bending springs, at their fixed ends 14.1, 14.2, are in positive engagement with the holding parts 12 and the support skirt 9, respectively. The design of the serration arrangement 16 is such that the occurring shearing forces are controlled safely.

Figure 2:
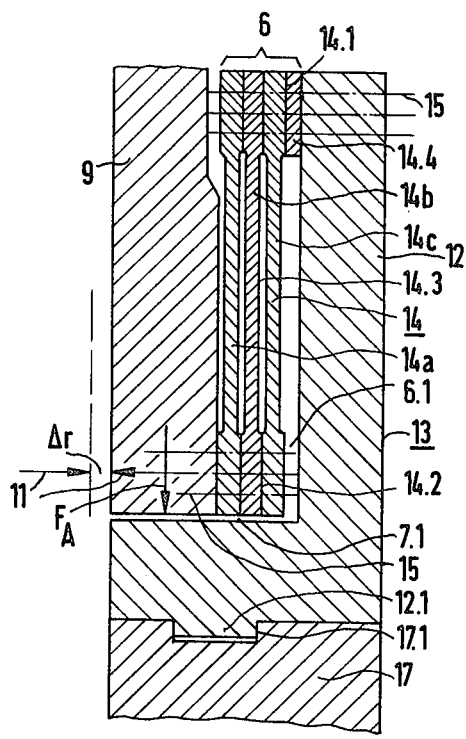
FIG. 2 in vertical section shows one example of the new vessel bottom holding arrangement.

It may be of interest here that the axial load $F_A$ of conventional reactor pressure vessels is in the order of magnitude of 30,000 tons, acting as a shearing force in the area of the serration arrangement. In their serrated area 16, the bending springs 14 are fixed to the holding parts 12 and the support skirt 9, respectively, by screw bolts, rivets or the like, not shown. In FIG. 2, the holding part 12 is in vertical section a steel angle, a projection 12.1 of which engages, on the bottom side, the recess 17.1 of a steel base plate 17 anchored in the concrete, resting on it flat. It may further be seen from FIG. 2, that, in the embodiment example shown therein, the bending springs 14 are multi-leaf springs, being divided into three parallel spring elements 14a, 14b, 14c, gaps 14.3 remaining between the shanks of the spring elements 14a, 14b, 14c; the gaps 14.3 facilitate the bending motion or deflection of the spring elements as well as the heat dissipation. The assembly of the bending springs of several individual bending spring elements also has the advantage that the spring stack can be composed of production building blocks, thus providing easy possibilities to design them from the aspect of elasticity and strength.

Figure 4:
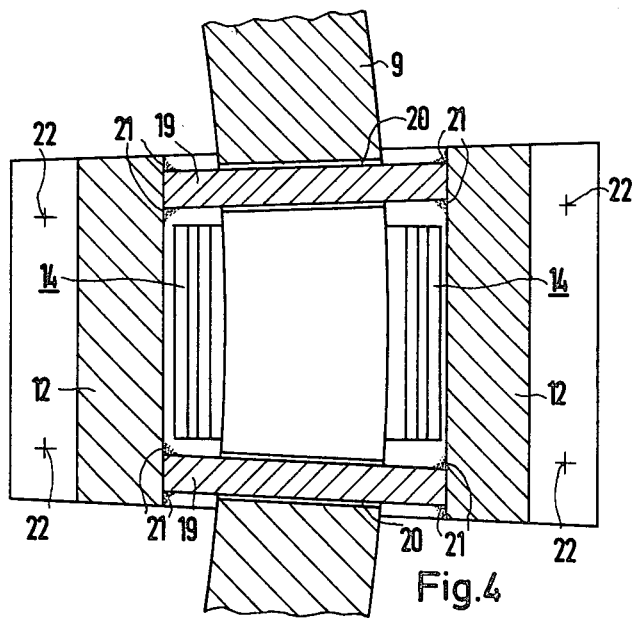
FIG. 4 is a horizontal cross section taken through the line IV—IV in FIG. 3.

While the arrangement in the embodiment example according to FIG. 2 is such that the bending springs 14 are disposed only on the outside of the support skirt 9, a symmetrical arrangement is provided in the embodiment example according to FIGS. 3 and 4, where the bending or leaf springs 14 are each divided into two spring element arrangements or sets 14A and 14B which — viewed radially — are disposed symmetrically on both sides of the support skirt 9. Each spring stack 14A and 14B contains two spring elements 14a, 14b, the upper interleaf 14.4 defining the radial gap 6. For assembly purposes, interleaves 14.4 are also provided here in the lower area 14.1. In addition, the mounting pad is somewhat modified, i.e., the holding part 12, now disposed on both sides of the support skirt 9, each consists of supporting plates 12.2, acting as columns which work in compression, welded to the steel base plate 12.1 (welds 12.3), and these supporting plates or columns, oriented axially-tangentially, have separate, positively attached extension parts 12.4 splined at 16 with the ends 14.1 of the spring elements or bending springs 14. A screw connection for the mounting parts 12.4 is indicated at 18.

Figure 5:
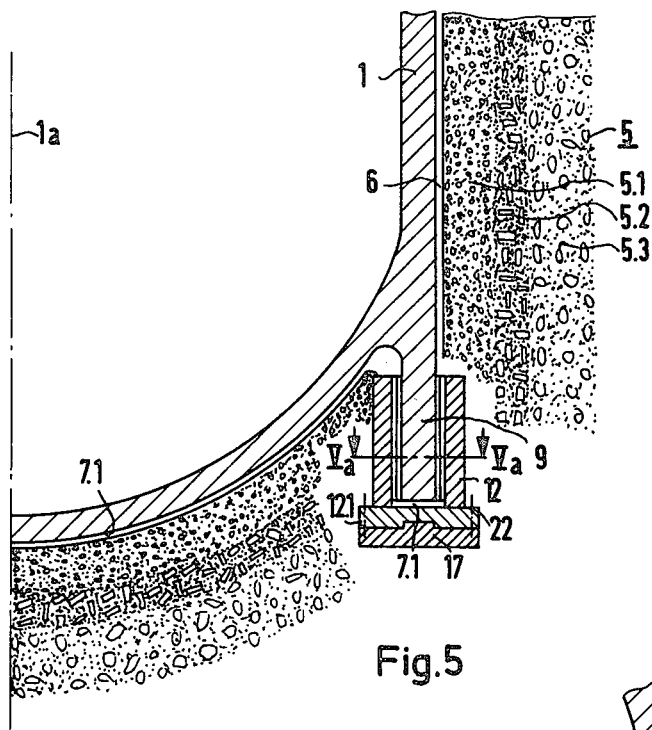
FIG. 5 is a vertical cross section taken through half of the bottom of a pressure vessel and its concrete pit and shows the FIGS. 3 and 4 form of the invention in use.
Figure 5A:
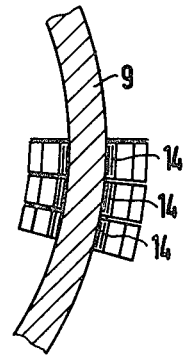
FIG. 5a is taken on the line $V_a$—$V_a$ in FIG. 5.

It may be seen from FIG. 5 in connection with FIG. 2 and FIGS. 3 and 4, respectively, that the supporting parts are formed by a depending support skirt 9 disposed at the bottom of the reactor pressure vessel 1 in a radial area, the free axial length of the support skirt 9 being made in accordance with that of the bending springs 14. FIG. 4, in particular, shows that the cross-sectional area of the bending springs 14 is rectangular and that the normals $n$ of their broad sides are oriented radially with respect to the axis 1a of the vessel 1 (FIG. 5). FIG. 5a shows a cutaway view that the axial load of the vessel 1 is absorbed by several bending springs 14 evenly distributed over its circumference. Details may be seen from FIG. 4, particularly that the holding parts 12 of the mounting pad 13, disposed on both sides of the support skirt 9, are interconnected and stiffened by cross bars 19, forming roughly box-shaped spring housings, with the cross bars 19 penetrating the support skirt 19 through slots 20. 21 designates the welds between the roughly radially-oriented cross bars 19 and the holding parts 12, and 22 designates the screw connection of the steel plate 12.1 to the base plate 17 (see also FIG. 5).

FIG. 5 shows further that the concrete hull 5, surrounding vessel 1 with a radial gap 6 and an axial gap 7.1, respectively, consists of several layers, namely, an insulating concrete layer 5.1, a reinforced-concrete layer 5.2 and an outer, graded-concrete layer 5.3. There are a number of advantageous possibilities regarding the arrangement of the spring elements 14 along the circumference of the vessel 1; for example, the groups of three, shown in FIG. 5a, may be distributed over the circumference or, generally speaking, $m$ groups of spring elements, each containing $n$ spring elements, may be uniformly distributed over the circumference ($n = 1, 2, 3 \ldots$). Naturally, the greater the $n$ number, the smaller the $M$ number.

Figure 6A:
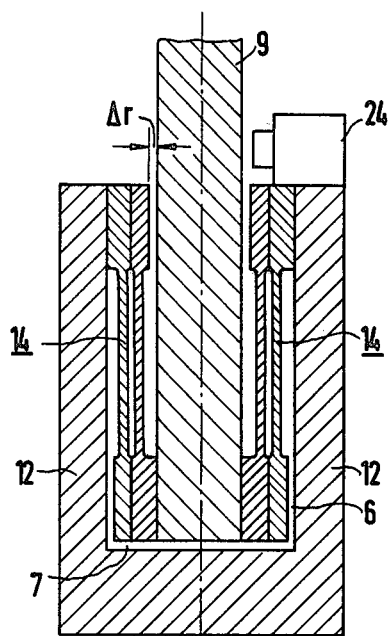
Figure 6B:
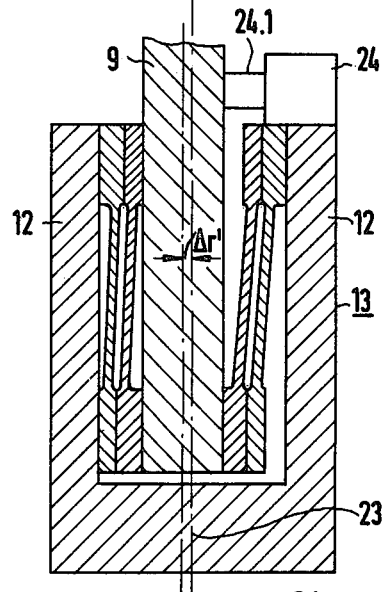

It may be seen from FIGS. 6a, 6b that the bending springs 14, in the cold state, are arranged so that they can be preloaded by the amount of radial thermal expansion $\Delta r$ of the reactor pressure vessel 1 that occurs and is expected during operation. As they are intended to explain the preloading only, these figures are drawn schematically or simplified. In the (cold) assembly state, the preloading is accomplished, according to FIG. 6b, by moving the holding parts 12 of the mounting pad 13 radially by $-\Delta r'$ relative to the support skirt 9 or the axis of symmetry 23 of the bending springs 14 where $\Delta r'$ approximates the amount of the radial thermal expansion $\Delta r$ (FIG. 6a) of the vessel 1 occuring during operation. In the embodiment example shown, this movement into the eccentric position is effected by means of a preloading device 24 which operates hydraulically and has an hydraulic ram 24.1. In particular, this preloading device may consist of multiple hydraulic cylinders designed in accordance with the respective groups $m$ of spring elements, so that the preloading operation can be shortened somewhat in this way (not shown). The position of the spring elements 14 and of the support skirt 9 in the operating condition, when the support skirt 9 and the spring elements 14 have regained their central position relative to the holding parts 12 due to the radial thermal expansion $\Delta r$, is evident from FIG. 6a. There, the preloading device 24 is shown in the detached condition.

What is claimed is:

1. A nuclear reactor pressure vessel installation comprising a vertical pressure vessel which is subjected axially and radially to thermal expansion forces when heated, the vessel having an upper portion and means for holding the upper portion against upward motion, the vessel having a lower portion and a second means for holding the lower portion against downward motion, axial expansion of the vessel placing it under axial stress, said second means being formed by a plurality of leaf springs positioned substantially vertically and having top and bottom ends, the bottom ends being fastened to the lower portion of the vessel, and means for supporting the springs' top ends so that the vessel is suspended by the springs with the springs carrying said axial stress in tension, the springs being free for cantilever motion permitting radial expansion of the vessel, the vessel's aforesaid lower portion being formed as a circumferential skirt depending from the vessel, the skirt having a bottom end to which the spring's bottom ends are fastened, said skirt having radially inner and outer sides and the springs forming sets of inner and outer springs respectively positioned on the skirt's inner and outer sides.

2. The installation of claim 1 in which said springs have flat rectangular cross-sectional shapes with broad sides and the vessel has a vertical axis, the springs being positioned with their broad sides substantially normal to the vessel's vertical axis.

3. The installation of claim 1 in which the skirt has a substantially cylindrical shape and said springs are interspaced substantially uniformly circumferentially around the skirt.

4. The installation of claim 1 in which each of said springs is a multi-leaf spring.

5. The installation of claim 1 in which the installation has preloading means for releasably preloading the springs when the vessel is not radially expanded and so that the springs are bent with their top and bottom ends relatively displaced radially with respect to said vessel a distance causing the springs to be positioned vertically when the vessel is thermally expanded radially and said preloading means releases the springs from said preloading.

6. The installation of claim 1 in which said springs are free from bending strain when the vessel is radially expanded.

7. The installation of claim 1 in which said means for supporting the springs' upper ends comprises sets of inner and outer columns extending upwardly respectively on the inner and outer sides of the skirt and having top ends to which the spring's top ends are fastened, the skirt having radial openings and the sets of columns having struts extending radially through these openings and fastened to the top ends of columns of each set in each instance.

8. The installation of claim 7 in which the ends of the springs are fastened respectively to the columns and skirt via interfitting circumferentially extending serrated fastenings.

* * * * *